US009425467B2

(12) United States Patent
Cerceau et al.

(10) Patent No.: US 9,425,467 B2
(45) Date of Patent: Aug. 23, 2016

(54) FUEL CELL PLATE AND STACK OF CELLS COMPRISING SUCH A PLATE

(71) Applicants: Arnaud Cerceau, Charavines (FR);
Daniel Gastaldin, Saint Nazaire les Eymes (FR); Nicolas Jannin, Sassenage (FR); Julien Marteau, Grenoble (FR);
Marion Paris, Grenoble (FR);
Elisabeth Rossinot, Meaudre (FR);
Helene Trouve, Sassenage (FR)

(72) Inventors: Arnaud Cerceau, Charavines (FR);
Daniel Gastaldin, Saint Nazaire les Eymes (FR); Nicolas Jannin, Sassenage (FR); Julien Marteau, Grenoble (FR);
Marion Paris, Grenoble (FR);
Elisabeth Rossinot, Meaudre (FR);
Helene Trouve, Sassenage (FR)

(73) Assignees: L'Air Liquide Société Anonyme Pour L'Étude, Paris (FR); Et L'Exploitation Des Procedes Georges Claude, Paris (FR)

( * ) Notice: Subject to any disclaimer, the term of this patent is extended or adjusted under 35 U.S.C. 154(b) by 148 days.

(21) Appl. No.: 14/063,126

(22) Filed: Oct. 25, 2013

(65) Prior Publication Data
US 2014/0120449 A1  May 1, 2014

(30) Foreign Application Priority Data
Oct. 25, 2012  (FR) ...................................... 12 60189

(51) Int. Cl.
| | |
|---|---|
| *H01M 2/18* | (2006.01) |
| *H01M 8/02* | (2016.01) |
| *H01M 8/24* | (2016.01) |
| *H01M 8/04* | (2016.01) |
| *H01M 8/10* | (2016.01) |

(52) U.S. Cl.
CPC ............ *H01M 8/0258* (2013.01); *H01M 2/18* (2013.01); *H01M 8/04253* (2013.01); *H01M 8/241* (2013.01); *H01M 8/2485* (2013.01); *H01M 8/0267* (2013.01); *H01M 8/04156* (2013.01); *H01M 2008/1095* (2013.01); *Y02E 60/50* (2013.01)

(58) Field of Classification Search
CPC ....................................................... H01M 2/18
USPC .......................................................... 429/468
See application file for complete search history.

(56) References Cited

U.S. PATENT DOCUMENTS

| | | | |
|---|---|---|---|
| 2002/0086198 A1* | 7/2002 | Ilno et al. ........................ | 429/34 |
| 2004/0110057 A1 | 6/2004 | Yoshimoto et al. | |
| 2004/0202911 A1* | 10/2004 | Komura et al. ................. | 429/32 |
| 2005/0271910 A1 | 12/2005 | Bai et al. | |

FOREIGN PATENT DOCUMENTS

EP          1 083 616          3/2001

OTHER PUBLICATIONS

French Search Report and Written Opinion for FR1260189, mailed Jul. 10, 2013.

* cited by examiner

*Primary Examiner* — Basia Ridley
*Assistant Examiner* — James Erwin
(74) *Attorney, Agent, or Firm* — Christopher J. Cronin

(57) ABSTRACT

A fuel cell plate includes at least one circulation channel for a reagent. The at least one circulation channel has an inlet communicating with a reagent distribution orifice formed through the plate. The plate also includes a reagent inlet collector orifice that is distinct from the reagent distribution orifice. The reagent inlet collector orifice supplies reagent to the inlet of at least one channel via a passage putting in fluid relationship the inlet collector orifice and the reagent distribution orifice, the inlet collector orifice extending longitudinally in the plane of the plate in a first longitudinal direction between a first bottom end and a second top end, the distribution orifice extending longitudinally in the plane of the plate in a second longitudinal direction between a first bottom end and a second top end, the first and second longitudinal directions being parallel to each other and vertical when the plate is in the vertical position of use, characterized in that, in the vertical position of use of the plate, the first bottom end of the inlet collector orifice is situated below the first bottom end of the distribution orifice.

6 Claims, 2 Drawing Sheets

FUEL CELL PLATE AND STACK OF CELLS COMPRISING SUCH A PLATE

CROSS-REFERENCE TO RELATED APPLICATIONS

This application claims the benefit of priority under 35 U.S.C. §119 (a) and (b) to French patent application No. 1260189, filed Oct. 25, 2012, the entire contents of which are incorporated herein by reference.

BACKGROUND

1. Field of the Invention

The present invention concerns a fuel cell plate as well as a stack of cells comprising such a plate.

2. Related Art

A stack of elementary fuel cell cells is an assembly of a plurality of electrochemical cells. Conventionally, each cell consists of two plates (in particular bipolar), an Electrode Membrane Assembly, plate seals and a system for the arrival and exit of the fluids in the cell.

According to a known configuration, the cells and therefore the plates are oriented vertically, that is to say the plane of the plates is vertical. In the known architectures, depending on the conditions of use of the cells, problems may occur with regard to the management of the water in the fuel cell (for example an Electrode Membrane Assembly immersed in water, a surplus of water in the reactive channels, poor supply of air, etc.).

SUMMARY OF THE INVENTION

One aim of the present invention is to overcome all or some of the drawbacks of the prior art disclosed above.

The invention concerns more particularly a fuel cell plate of the proton exchange membrane type, the plate being intended to cooperate with another cell plate in order to sandwich an Electrode Membrane Assembly, in the position of use the plate is disposed in a vertical plane, the plate comprising two opposite faces, respectively a reactive face and a cooling face, the reactive face of the plate being provided with reliefs and hollows forming at least one circulation channel for a reagent, the at least one circulation channel for a reagent having an inlet communicating with a reagent distribution orifice formed through the plate, the plate also comprising a reagent inlet collector orifice that is distinct from the reagent distribution orifice, the reagent inlet collector orifice being provided to supply reagent to the inlet of at least one channel via a passage putting in fluid relationship the inlet collector orifice and the reagent distribution orifice, the inlet collector orifice extending longitudinally in the plane of the plate in a first longitudinal direction between a first bottom end and a second top end, the distribution orifice extending longitudinally in the plane of the plate in a second longitudinal direction between a first bottom end and a second top end, the first and second longitudinal directions being parallel to each other and vertical when the plate is in the vertical position of use. The invention is essentially characterised in that, in the vertical position of use of the plate, the first bottom end of the inlet collector orifice is situated below the first bottom end of the distribution orifice.

Moreover, embodiments of the invention may comprise one or more of the following features:

in the vertical position of use of the plate, the first bottom end of the inlet collector orifice is situated below the first bottom end of the distribution orifice at a distance D of between 0.5 mm and 50 mm, the inlet collector orifice and the distribution orifice are adjacent and have parallel oblong shapes overall, the plate comprises a peripheral seal disposed on the reactive face and comprising a portion forming a loop around the inlet collector orifice, the at least one circulation channel comprises an outlet with a reagent discharge orifice formed through the plate, the plate also comprising a reagent outlet collector orifice that is distinct from the discharge orifice, the outlet collector orifice being provided to recover the reagent at the discharge from at least one channel via a passage putting in fluid relationship the outlet collector orifice and the discharge orifice, the outlet collector orifice extending longitudinally in a third direction in the plane of the plate between a first bottom end and a second top end, the discharge orifice extending longitudinally in the plane of the plate in a fourth longitudinal direction between a first bottom end and a second top end, the third and fourth longitudinal directions being parallel to each other and vertical when the plate is in the vertical position of use, and in that, in the vertical position of use of the plate, the first bottom end of the outlet collector orifice is situated below the first bottom end of the discharge orifice, in the vertical position of use of the plate, a portion of between one third and two thirds of the outlet collector orifice is situated below the discharge orifice.

The invention may also concern a stack of fuel cell cells in which the cells are provided with plates according to any one of the above or following features.

The invention may also concern any alternative device or method comprising any combination of the above or following features.

BRIEF DESCRIPTION OF THE FIGURES

Other particularities and advantages will emerge from a reading of the following description, given with reference to the figures, in which.

DETAILED DESCRIPTION OF THE INVENTION

Figure 1:
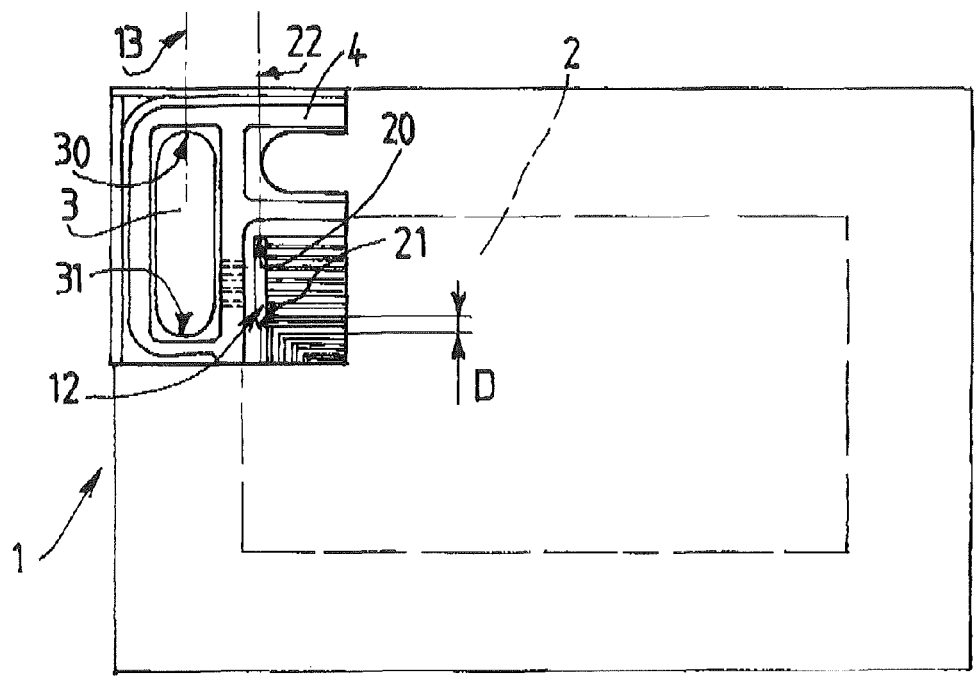
FIG. 1 shows a front view, schematic and partial, of the reactive face of a fuel cell plate illustrating a first detail of a possible example of an embodiment of the invention.

As illustrated in FIG. 1, the fuel cell plate comprises two opposite faces, respectively a reactive face and a cooling face.

FIG. 1 shows schematically and partially the reactive face that is provided with reliefs and hollows forming at least one circulation channel 2 for a reagent.

The at least one circulation channel 2 for a reagent has an inlet communicating with a reagent distribution orifice 12 formed through the plate 1. The plate 1 also comprises a reagent inlet collector orifice 3 that is distinct from the reagent distribution orifice 12. The reagent inlet collector orifice 3 is provided to supply reagent to the inlet of at least one channel 2 via a passage formed on the cooling face of the plate 1 putting in fluid relationship the inlet collector orifice 3 and the reagent distribution orifice 12. This passage is shown schematically by broken lines and may be formed by a hollow formed in the thickness of the plate at the separation between the two orifices 3, 12.

Figure 3:
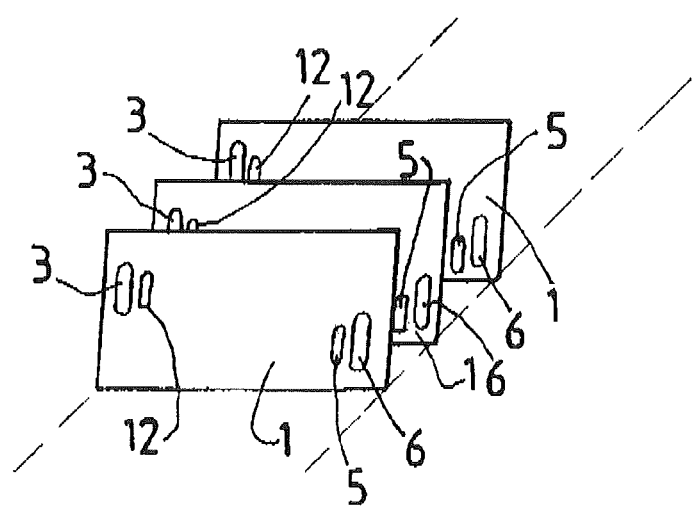
FIG. 3 shows a schematic and partial perspective view illustrating a stack of plates forming cells of a fuel cell.

The inlet collector orifice 3 extends longitudinally in the plane of the plate 1 in a first longitudinal direction 13 between a first bottom end 31 and a second top end 30. The distribution orifice 12 extends longitudinally in the plane of the plate 1 in a second longitudinal direction 22 between a first bottom end 21 and a second top end 20. The first 13 and second 22 longitudinal directions are parallel to each other and vertical when the plate 1 is in the vertical position of use (cf. FIG. 3). In the vertical position of use of the plate, the first bottom end 31 of the inlet collector orifice 3 is situated below the first bottom end 21 of the distribution orifice 12.

As can be seen in FIG. 1, in the vertical position of use, the collector orifice 3 for entry of the reactive gases is mainly positioned above the distribution orifice 12, except for its bottom end 31.

In this way, there cannot be any significant reserve of water in the collectors 3 and distribution orifice 12 of a fuel cell stack. This avoids any problem of water management in the fuel cell, in particular during start-ups, changes in regime or purges (water hammer).

This downward withdrawal of the collector 3 with respect to the distribution orifice 12 also has an advantage for start-ups of the fuel cell at negative temperature. This is because, after prolonged storage at low temperature or at negative temperature, the condensation water will potentially stagnate or freeze at a low point on the collector 3 without obstructing the arrival of the gases at the distribution orifice 12 situated higher up.

Figure 2:
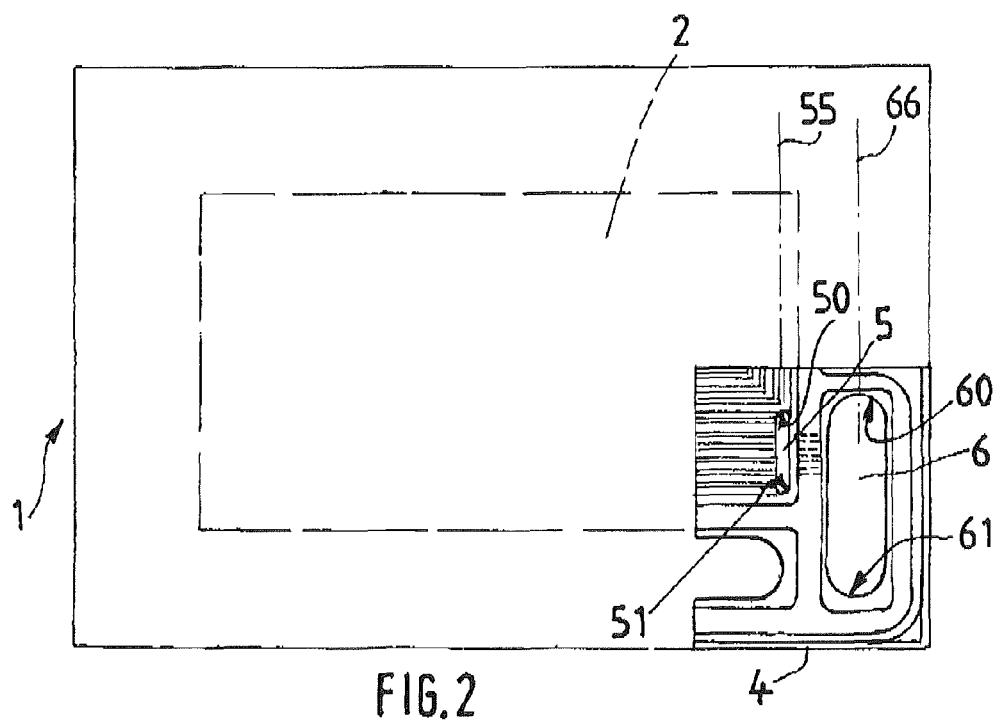
FIG. 2 shows a front view, schematic and partial, of the reactive face of a fuel cell plate illustrating a second detail of a possible example embodiment of the invention.

FIG. 2 illustrates the arrangement of the outlet collector 6 with respect to the discharge orifice that receives the reactive gas discharged from the channel 2.

The arrangement of the outlet collector 6 with respect to the discharge orifice 5 is preferably symmetrically identical to the above with respect to the centre of the plate 1 (bottom end of the collector orifice 6 situated below the bottom end of the discharge orifice 5). That is to say the arrangements of the discharge orifices 5 and of the outlet collector 6 are systematically identical respectively to the distribution orifices 12 and inlet collectors 3. That is to say that the collectors 5, 6 are identical and disposed symmetrically with respect to the centre of the plate 1. Likewise, the distribution 12 and discharge 5 orifices are identical and disposed symmetrically with respect to the centre of the plate 1. The plate is thus symmetrical at its inlets and outlets. That is to say the plate does not have distinct high and low sides and can be mounted without requiring positive location to dispose the inlet at the top and the outlet at the bottom or vice versa. This facilitates the assembly of the fuel cell.

In addition, the symmetry (same dimensions) of the collectors 3, 6 and orifices 12, 5 between the inlet and outlet confers on the plate a good compromise in functioning between firstly the need to limit the size of the outlet orifices and collectors (to force the flow speed) and secondly the need to increase this size (to discharge large quantities of water) and the need to have an inlet (collector 3, orifice 12) of sufficient size.

The functioning of the fuel cell is improved in particular with regard to the discharges of water.

The discharge orifice 5 is for example mainly positioned above the outlet collector 6. This also prevents an accumulation of water in the gas channels and prevents "water returns" from the outlet collector 6 to the discharge orifice 5.

These structures thus allow better management of the water at the fluid inlet and outlets (collectors 3, 6, orifices 12, 5), in particular at low temperatures.

This improves the performance and service life of the corresponding cell, stack of cells and fuel cell.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A proton exchange membrane fuel cell plate, the plate being intended to cooperate with another proton exchange membrane fuel cell plate in order to sandwich an Electrode Membrane Assembly, the plate comprising opposed reactive and cooling faces, a reagent inlet collector orifice, and a reagent outlet collector orifice, in the position of use the plate being disposed in a vertical plane, wherein:
   the reactive face of the plate is provided with reliefs and hollows forming circulation channels for a reagent;
   a reagent distribution orifice is formed through the plate;
   each of the circulation channels for a reagent has a respective inlet, each of the circulation channel inlets communicates with the reagent distribution orifice;
   the reagent distribution orifice is distinct from the reagent inlet collector orifice;
   the reagent inlet collector orifice is in fluid communication with the reagent distribution orifice via a first passage;
   a major dimension of the reagent inlet collector orifice extends longitudinally in the plane of the plate in a first longitudinal direction between a first bottom end and a second top end;
   a major dimension of the reagent distribution orifice extends longitudinally in the plane of the plate in a second longitudinal direction between a first bottom end and a second top end;
   the first and second longitudinal directions are parallel to each other and vertical when the plate is in the vertical position of use;
   in the vertical position of use of the plate, the first bottom end of the reagent inlet collector orifice is situated below the first bottom end of the reagent distribution orifice;
   each of the circulation channels has a respective outlet fluidly connected to the reagent discharge orifice formed through the plate;
   the reagent outlet collector orifice is distinct from the reagent discharge orifice;
   the reagent outlet collector orifice is designed to recover the reagent at the reagent discharge orifice from the circulation channels via a second passage that is in fluid communication between the reagent outlet collector orifice and the reagent discharge orifice;
   the reagent outlet collector orifice extends longitudinally in a third direction in the plane of the plate between a first bottom end and a second top end;
   the reagent discharge orifice extends longitudinally in the plane of the plate in a fourth longitudinal direction between a first bottom end and a second top end;
   the third and fourth longitudinal directions are parallel to each other and vertical when the plate is in the vertical position of use; and in the vertical position of use of the plate, the first bottom end of the reagent outlet collector orifice is situated below the first bottom end of the reagent discharge orifice.

2. The plate of claim 1, wherein, in the vertical position of use of the plate, the first bottom end of the reagent inlet collector orifice is situated below the first bottom end of the reagent distribution orifice at a distance D of between 0.5 mm and 50 mm.

3. The plate of claim 1, wherein the reagent inlet collector orifice and the reagent distribution orifice are adjacent and have parallel oblong shapes overall.

4. The plate of claim 1, wherein the plate comprises a peripheral seal disposed on the reactive face that comprises a portion forming a loop around the reagent inlet collector orifice.

5. The plate of claim 1, wherein, in the vertical position of use of the plate, a proportion lying between one third and two thirds of the reagent outlet collector orifice is situated below the reagent discharge orifice.

6. A stack of fuel cells comprising the proton exchange membrane fuel cell plates of claim 1 sandwiching Electrode Membrane Assembly plates.

* * * * *